United States Patent [19]

Torini

[11] Patent Number: 5,750,393
[45] Date of Patent: May 12, 1998

[54] PROCESS FOR PREPARING BIOMASS TO IMPROVE THE KINETICS OF SOLID-STATE OXIDATIVE BIOTRANSFORMATIONS

[75] Inventor: Alberto Torini, Milan, Italy

[73] Assignee: Italtraco S.r.l., Milan, Italy

[21] Appl. No.: 666,397

[22] PCT Filed: Jan. 3, 1994

[86] PCT No.: PCT/EP94/00004

§ 371 Date: Jun. 24, 1996

§ 102(e) Date: Jun. 24, 1996

[87] PCT Pub. No.: WO95/18778

PCT Pub. Date: Jul. 13, 1995

[51] Int. Cl.$^6$ .............................. C12N 1/00; A23C 9/12
[52] U.S. Cl. .............................. 435/243; 426/61
[58] Field of Search ...................... 435/243, 209, 435/252.1, 267, 917, 309.1; 426/61

[56] References Cited

U.S. PATENT DOCUMENTS 5,184,780   2/1993   Wiens ........................................ 241/19

FOREIGN PATENT DOCUMENTS

| 1 082 861 | 6/1960 | Germany . |
| 1 145 646 | 3/1963 | Germany . |
| 28 21 951 | 11/1979 | Germany . |
| 40 41 501 | 5/1992 | Germany . |
| 41 11 204 | 10/1992 | Germany . |

*Primary Examiner*—Jon P. Weber
*Assistant Examiner*—Susan Hanley
*Attorney, Agent, or Firm*—Young & Thompson

[57] ABSTRACT

A process is disclosed for preparing a biomass to improve the kinetics of solid-state oxidative biotransformations. The method comprises pulverizing a biomass comprising a solid culture substrate, mixing the pulverized biomass with an inoculum containing microorganisms, adjusting the moisture content of the mixed biomass to at least 25% (w/w), saturating the biomass with air or oxygen during steps and agglomerating the pulverized, mixed and saturated biomass into granules having a volume of less than 10 cm$^3$.

8 Claims, No Drawings

PROCESS FOR PREPARING BIOMASS TO IMPROVE THE KINETICS OF SOLID-STATE OXIDATIVE BIOTRANSFORMATIONS

This application was filed under 35 U.S.C. §371 and claims the benefit of PCT Application PCT/EP94/00004 filed Jan. 3, 1994.

BACKGROUND OF THE INVENTION

The solid-state culture of microorganisms, where this is possible, has advantages over classic liquid-phase cultures in respect of numerous factors, ranging from the operating conditions, which control and promote the growth of the microorganism(s) used, to the collection of the biomass produced.

In general, solid-state culture is acknowledged to have the following positive aspects:

energy consumption is minimal;
the environmental conditions of the substrate can be adjusted to reproduce those in which the microorganism develops in nature;
bacterial contamination is highly unlikely;
the equipment required is less complex;
the biomass produced is economical to collect.

Solid-state biotransformation has been studied by numerous experts but virtually all the solutions proposed have involved composting. The equipment required for this has undergone rapid, constant development and become increasingly specialized and specific to this technology.

Composting (a solid-state thermophilic oxidative biotransformation process) differs from other solid-state oxidative biotransformation processes in that it uses polygenic substrates (mixture of organic products of varying origin) and requires a rich and varied bacterial flora in which the microorganisms, each capable of complementary functions, work together to attack all the constituents of the substrates and produce degradation of the soluble and toxic products in the presence of oxygen and moisture. The other oxidative biotransformation processes, by contrast, use specific substrates and/or well-defined strains of microorganisms that grow in specific environmental conditions.

The composting method involves the use of substrates that are fairly coarsely shredded in order to obtain biomasses with interstitial spaces (homogeneous empty spaces) that account for more than 25% of the total volume of the biomass to be bio-oxidized.

This is done in an attempt to overcome the problem, commonly encountered with agglomerated biomasses, of anaerobic fermentation occurring during the bio-oxidation stage.

If the substrates are per se extremely fragmented and/or have a tendency to agglomerate, it is common practice to mix them with materials comprising large pieces (bulking agents) to create the interstitial spaces necessary to enable the air to flow and diffuse uniformly during the bio-oxidation stage. Another solution is to use systems that enable the biomass to be turned fairly frequently so as to break up the lumps and expose the resulting fragments to the air.

In all these cases, the substrates to be biotransformed are prepared in such a way as to prevent the formation of agglomerates, since damaging anaerobic fermentation would inevitably occur within these.

The principal limitations of all the systems currently in use are:

poor, uneven aeration of the biomass;
fluctuation of the temperature of the biomass during the bio-oxidation stage;
unsuitability of the system to the use of mycelial microorganisms;
few "active contacts" between microorganisms/enzymes and substrate;
little, if any, protection of the enzymes/microorganisms against external agents;
limited use of the capacity of the bioreactors.

The reasons for these limitations have been studied and identified as follows:

The poor and uneven aeration of the biomass is due mainly to the fact that during the bio-oxidative process the "structure" of the solid substrates loses its original characteristics. As a result the substrates tend to collapse and fall in on themselves or, in the case of rigid substrates, tend to become compacted. Consequently, areas develop where the substrate becomes compacted, reducing and/or eliminating the interstitial spaces, with the result that the air flow is reduced or blocked in these areas.

The temperature fluctuations during the bio-oxidative stage are due to the moisture initially present in the biomass evaporating during the turning—which is designed to break up the aggregated mass and aerate it at the same time—and to conductive and convective phenomena developing in the biomass.

The unsuitability of the system to the use of mycelial microorganisms is due to the fact that the mycelium is damaged when the biomass is turned and so prevented from developing to the optimal degree on the surface of the substrate to be used and converted into useful biomass and/or into a particular product.

The low number of active contacts between microorganisms/enzymes and substrate is due mainly to the limited surface area of the substrate.

The lack of protection for the enzymes/microorganisms against external agents is due mainly to the virtually non-existent porosity of the solid substrates.

The limited use of the capacity of the bioreactors is linked to the need to mix the biomass with bulking agents and/or to turn or stir the biomass.

As well as leading to lack of uniformity of the new biomasses produced, these factors are responsible for the long periods for which the biomass remains in the bio-reactors. These must therefore have a large capacity and the attendant energy costs are high. In practice, these factors discourage large-scale use of this technology.

So far little or nothing has been done to exploit the potential of the biotechnology under consideration on an industrial scale. The reason for this is that industrial use of the technology of bio-oxidation of solid substrates requires not only specialist knowledge of the biochemical characteristics of the microorganisms to be used but in particular the availability of a suitable process and the corresponding equipment.

At present, as we have seen, the techniques used for solid-state oxidative biotransformation of specific substrates typically involve composting in a more or less sophisticated form, but these processes are completely unsatisfactory.

However, solid-state oxidative biotransformation has enormous potential and is one of the most promising areas of development of modern biotechnological sciences.

For example, the possibility of biodegrading and bio-transforming natural polymers such as lignin, celluloses and hemicelluloses into high added-value metabolites has recently stimulated numerous researchers to start new studies of the biochemical characteristics of a wide variety of species of microorganisms with a view to using them in the biodegradation and biotransformation of lignocellulose materials.

The practical results of these biotransformations are of interest to the following sectors:

industry: organic acids, alcohols, polysaccharides, biopolymers, enzymes to stabilize fruit juices/wines, etc.;

medicine: antibiotics and other useful products such as antitumoral and antiviral agents, enzymes for medicinal applications, etc.;

the environment: enzymes for the detoxification of pesticides and toxic and noxious wastes, organic substances for the removal of heavy metals from effluent, etc.;

agriculture: biological pesticides, biofertilizers, humic acids, etc..

At present, therefore, there is an unsatisfied demand for an innovative solution that can be applied on an industrial scale and enable the potential of this bio-technology to be exploited economically.

SUMMARY OF THE INVENTION

The principal aim of the present invention is to propose a method for the preparation of biomasses—comprising a solid culture substrate—for subjection to mesophilic or thermophilic oxidative biotransformation that will eliminate and/or drastically reduce the technical problems described, thereby improving the kinetics of the solid-state bioreactions and also permitting optimal development of mycelial microorganisms.

The method of preparation of the biomass, which constitutes the subject of the invention, consists in:

Grinding the solid substrate finely, thereby increasing its surface area and porosity. The largest dimensions of these solids, after pulverization, are of the order of millimeters.

Mixing the solid substrate thoroughly with the inoculum, at ambient temperature and in the presence of air, until saturation is achieved; if necessary adjusting the moisture content of the mixture—e.g. with liquid substrates—to a value of not less than 25% and preferably not less than 45%.

Agglomerating the biomass into small pieces measuring preferably less than 10 cm$^3$ and even more preferably less than 1 cm$^3$.

The resulting agglomerated biomasses, by virtue of the oxygen present in them, start the bio-oxidation process even during the preparation stage and consequently desorb the products of oxidation ($CO_2$ and water vapour), enabling a natural respiration mechanism to be instigated. This method of preparation also permits drastic reduction and/or elimination of the lag phase associated with these biological transformations; this helps drastically to reduce the period for which the biomass remains in the bioreactors and results in perfectly uniform finished products.

DETAILED DESCRIPTION

To provide a better description of the characteristics and advantages of the present invention, there now follow various non-limiting examples of the practical application of the invention and a comparative example.

Example No.1 and comparative example

Using a shredder, approximately 110 kg wheat straw were shredded, reducing it to pieces 3–7 cm long.

55 kg straw were then passed through a suitable knife mill to obtain pieces with a maximum length of less than 2 mm. The ground straw was then mixed thoroughly, in the cold and with air being insufflated until the mixture was saturated, in a paddle mixer with 40 water to which had been added: approximately 1500 ml culture broth containing a cellulosolytic microorganism, *Aspergillus niger;* approximately 1.5% of powdered phosphorite; sufficient urea to increase the C:N ratio of the mixture from 98:1 to 35:1; a sufficient quantity of a 1.5% solution of CMC (carboxymethyl cellulose) in water to make the mixture more easily agglomerable.

The same procedure, but without the addition of CMC, was carried out separately on the remaining 55 kg of shredded straw.

The mixture containing the pulverized straw was then agglomerated, using an industrial meat mincer, to give a compacted product approximately 5 mm in diameter and varying between 5 and 10 mm in length.

The resulting biomasses were collected separately in two painted iron containers with a capacity of approximately 1 m$^3$ each and perforated bases to promote natural circulation of fresh air through the biomasses.

The biomass comprising shredded straw, because of evident compression, required mixing every day from the second day to the seventh day, then every 3 days until the 21st day, and after that weekly turning. The pelletized biomass, on the other hand, required no movement.

The Table below shows the carbon content of the dry matter as a function of time:

| Time | Carbon, % | |
|---|---|---|
| (days) | EXAMPLE 1 | COMPARISON |
| 5 | 26.8 | 42.7 |
| 12 | 19.8 | 39.2 |
| 19 | 19.2 | 36.1 |
| 40 | 19.5 | 32.9 |
| 61 | — | 23.8 |
| 104 | — | 22.7 |

Conclusions

The test conducted clearly demonstrated that the physical composition of the substrate and the preparation process had a great effect on the kinetics of the bio-oxidation reactions.

In Example No.1 the process started immediately, in the mixer, and enabled a large proportion of the volatile solids to be metabolized within a short time.

Preparing the biomass in this way therefore significantly reduces the overall oxidative biotransformation time. Hence, for equal dimensions, the operational efficiency of the plant is improved and costs are reduced. These advantages can be further enhanced, as we shall see in Example No.2 following, by mixing the solid substrate with some of the biomass that has already been biotransformed (recycling). In this way the concentration of micro-organisms and enzymes in the biomass to be biotransformed can be increased to any value required.

It is therefore useful, when possible, to use as inoculum proportions of metabolized biomass—in which the microorganisms are already perfectly adjusted to the environment and developed to the optimal degree and have produced considerable quantities of enzymes—as a means of further reducing the biotransformation times.

Example No. 2

Approximately 55 kg of wheat straw were shredded then ground as in Example No.1 above.

They were then mixed, by the same method as described in Example No.1, with approximately 45 liters of water containing approximately 1.5% powdered phosphorite and sufficient urea to bring the C:N ratio of the mixture to approximately 35:1. During the mixing, approximately 15 kg of previously pulverized biomass taken from the experiment described above after 12 days bio-oxidation were added.

The resulting mixture was agglomerated with the aid of the meat mincer as before, giving a compacted product 5 mm in diameter and of similar length which was collected in a painted iron container with a capacity of approximately 1 $m^3$. A false bottom had been created in this container to permit insufflation of fresh air which was distributed evenly over the base of the container and then passed through the biomass. The quantity of air insufflated was 500 l/h; two homogeneous samples (mixtures of three samples) were taken, one after 4 days and the other after 8 days. The 4-day sample contained 20.7% carbon and the 8-day sample 19.1% carbon.

This therefore confirmed that by using the same method for preparing the biomass but inoculating a large quantity of recycled biomass and maintaining a forced circulation of air it is possible to reduce the bio-oxidation times even further.

Example No.3

65 kg of sawdust (approx. 250 microns) were mixed thoroughly, at ambient temperature in a paddle mixer with air insufflation, with an inoculum-substrate of approximately 150 kg of droppings from laying hens (materials that are widely used in composting equipment and whose mean behaviour is known).

The biomass was passed through a meat mincer to yield a compacted product resembling thick spaghetti. The apparent density of approximately 10 liters of material was 620 $kg/M^3$. Approximately 350 liters of material were produced in this way and placed immediately on a covered surface in the open, on which the experiment was conducted.

The process of agglomeration was accompanied by heating of the material, which was not accurately measured. This caused moisture to rise to the surface, giving rise to rapid evaporation, followed by equally rapid cooling of the material.

The initial theoretical moisture content, based on the components of the mixture, was 51.5%, whereas the analysis of the first sample revealed a value of 34.6%. The difference can be explained by the mechanical action of pelletization (a similar effect occurs when other products are pelletized) which promotes the migration of moisture towards the exterior of the pellet and its subsequent rapid evaporation, as can be observed visually.

The measurements were limited to recording of the temperature of the mass every two days and daily sampling of the material.

This yielded 13 samples, all of which were tested for their moisture and ash content, while the initial and final samples only were also subjected to analysis of their principal components (N, P, K) and moisture content.

Results

Table 1 below sets out all the data gathered.

TABLE 1

| Consec. days | Air temp. | Temp. of mass | Moist. cont. | Ash, % of T.S. | T.S. (g)* | $H_2O$ (g)* | Tot. wt* | Wt of ash |
|---|---|---|---|---|---|---|---|---|
| 1 | 16.5 | 42.0 | 34.6 | 7.6 | 654 | 346 | 1000 | 49.704 |
| 2 | 16.0 | 62.0 | 34.6 | 8.8 | 565 | 299 | 864 | 49.704 |
| 3 | 14.0 | 64.0 | 37.3 | 9.2 | 540 | 321 | 862 | 49.704 |
| 4 | 18.0 | 60.0 | 35.4 | 8.8 | 565 | 310 | 874 | 49.704 |
| 5 | 16.5 | 55.0 | 36.8 | 9.7 | 512 | 298 | 811 | 49.704 |

TABLE 1-continued

| Consec. days | Air temp. | Temp. of mass | Moist. cont. | Ash, % of T.S. | T.S. (g)* | $H_2O$ (g)* | Tot. wt* | Wt of ash |
|---|---|---|---|---|---|---|---|---|
| 6 | 11.0 | 56.0 | 36.8 | 10.2 | 487 | 284 | 771 | 49.704 |
| 7 | 9.5 | 48.0 | 38.2 | 10.2 | 487 | 301 | 789 | 49.704 |
| 8 | 8.0 | 36.0 | 40.4 | 10.6 | 469 | 318 | 787 | 49.704 |
| 9 | 11.0 | 25.0 | 39.9 | 10.5 | 473 | 314 | 788 | 49.704 |
| 10 | 11.0 | 20.0 | 41.4 | 11.3 | 440 | 311 | 751 | 49.704 |
| 11 | 14.0 | 15.0 | 40.5 | 10.7 | 465 | 316 | 781 | 49.704 |
| 12 | 10.0 | 15.0 | 43.1 | 11.8 | 421 | 319 | 740 | 49.704 |

*calculated on the assumption that ash remains constant based on a total of 1 kg of initial material The remaining parameters were calculated from the analytical values (moisture content and ash as % of Total Solids) assuming the amount of ash present to have remained constant, because ash, to an optimal approximation, represents the principal constant in the entire process and it was therefore possible, by working backwards, to calculate both the amounts of Total Solids, theoretically derived from 1 kg of initial material, and the amounts of water they contain. In addition it was found that approximately 230 g of Volatile Solids, equal to 35% of the Total Solids present, were consumed during the process.

Although a similar experiment would be expected to produce widely varying samples, the particular care taken during this stage to take samples from various parts of the mass so as to form a more significant sample, enabled the sample to be homogenized and rendered highly significant, as demonstrated by the substantial uniformity of the results provided by the analyses.

These do in fact reveal a progressive, well-defined pattern of behaviour which, together with the temperature changes, enables various conclusions to be drawn about the dynamics of the process.

Interpretation of the data

The most striking factor is the sharp rise in the temperature from the very first day. In this specific case, this is a sign of the rapid initiation of thermophilic bio-oxidation, which was accompanied by intense evaporation and a marked breakdown of Total Solids.

It may be observed that the same materials had been processed by the conventional method, thermophilic biooxidation would have required at least 3–4 days to commence. Having started rapidly, the process was also completely rapidly.

It can be seen from the Tables and Figures that bio-oxidation may be considered to be practically exhausted after the sixth day, with temperatures falling towards ambient temperature and evaporation ceasing.

The final increase in absolute moisture content can be attributed in our opinion to the water produced during the bio-oxidation process.

Conclusions

The test conducted clearly demonstrated that the physical composition of the solid substrate also has a great effect on composting reactions.

The process starts more rapidly and within a short time enables a not inconsiderable proportion of the volatile solids to be broken down.

The rapid initial rise in temperature is sufficient to eliminate any pathogens, while the final product, which is still damp and of which the fermentable part is not completely exhausted, has no obvious odour and is presented in an optimal state to pass on to the maturation process.

This experiment showed how the use of the method of preparing the biomass that constitutes the subject of the present invention results in a considerable reduction in the overall reaction periods. Hence, for equal dimensions, the equipment operates more efficiently and costs are consequently reduced. These advantages can be further enhanced by using amounts of previously bio-oxidized product in the initial formulation.

Example No.4

10 kg of wheat straw were shredded and then pulverized as in Example 1.

The prepared solid substrate was sterilized at 105° C. for 60 minutes and was then mixed, in a sterile chamber, with 8 liters of sterilized water—containing the nutrients and mineral salts necessary for the growth of the microorganisms—to which was added 1 liter of culture broth containing mycelia of *Volvariella volvaceae* (lignocellulosolytic microorganism). During the mixing period, sterile air was insufflated until the mixture was saturated.

The resulting biomass was agglomerated as before in the meat mincer, which had first been sterilized with formaldehyde, and then placed in a previously sterilized stainless steel container kept at 30° C. in a thermostatically-controlled chamber into which were insufflated approximately 150 l/h of sterile air.

After 96 hours' bio-oxidation, a 34% loss of organic substance was found, indicating significant metabolic activity by the mycelium in question under the processing conditions that constitute the subject of the present invention.

I claim:

1. A process for preparing a biomass comprising a solid culture substrate so as to improve kinetics of a solid-state oxidative biotransformation of the biomass, comprising the steps:

(a) pulverizing a biomass comprising a solid culture substrate that is to be subjected to solid-state oxidative biotransformation;

(b) mixing at ambient temperature the pulverized biomass with an inoculum containing microorganisms suitable for solid-state oxidative biotransformation of the pulverized biomass;

(c) adjusting the moisture content of the mixed biomass to not less than 25% (w/w);

(d) saturating the biomass with air or oxygen during steps (a) or (b) or between step (a) and step (b); and (e) agglomerating the pulverized, mixed and saturated biomass into granules having a volume of less than 10 $cm^3$.

2. The process of claim 1, wherein the step of pulverizing comprises the step of pulverizing the biomass into particles with dimensions smaller that 5 mm.

3. The process of claim 1, further comprising the step of adding microorganisms or enzymes from a previously bio-oxidized biomass to the biomass of step (a) during step (b) or step (e) or between steps (b) and (e).

4. The process of claim 1, further comprising the step of adding additional organic or inorganic chemical products to the biomass during step (b) or step (e) or between steps (b) and (e).

5. The process of claim 1, wherein each of the granules of step (e) are about cylindrical in shape and has a diameter not greater than 5 mm.

6. The process of claim 5, wherein each of the granules of step (e) has a length of about 5 mm to about 10 mm.

7. The process according to claim 1, wherein each of the granules of step (e) has a volume of less than 1 $cm^3$.

8. The process according to claim 1, wherein the moisture content of the mixed biomass of step (b) is adjusted to not less than 45% (w/w).

* * * * *